United States Patent [19]

Bachl

[11] 4,278,397
[45] Jul. 14, 1981

[54] FLUID FLOW MACHINE

[75] Inventor: Herbert Bachl, Munich, Fed. Rep. of Germany

[73] Assignee: Getwent Gesellschaft fur Technische und wissenschaftliche Energieumsatzehtwicklungen m.b.H., Kaufbeuren-Neugablonz, Fed. Rep. of Germany

[21] Appl. No.: 19,842

[22] Filed: Mar. 12, 1979

[30] Foreign Application Priority Data

Jan. 29, 1979 [EP] European Pat. Off. ......... 79100255.3
May 16, 1978 [DE] Fed. Rep. of Germany ....... 2821233

[51] Int. Cl.$^3$ .............................................. F01D 1/06
[52] U.S. Cl. ........................................ 415/83; 415/87; 415/199.1; 415/212 R; 60/39.43
[58] Field of Search ............... 415/79, 83, 86, 92, 415/93, 95, 97, 202, 87, 199.1, 212 R, 213 R; 416/180; 60/39.43

[56] References Cited

U.S. PATENT DOCUMENTS

| | | | |
|---|---|---|---|
| 802,025 | 10/1905 | Wagner | 415/202 |
| 833,305 | 10/1906 | Dake | 415/87 |
| 1,338,708 | 5/1920 | Sterzing | 415/87 |
| 2,055,895 | 9/1936 | Fawcett | 415/79 |
| 2,145,131 | 1/1939 | Rhines | 415/79 |
| 2,417,600 | 3/1947 | Jutte | 415/83 |
| 2,556,676 | 6/1951 | Carnegie | 416/180 |
| 4,029,431 | 6/1977 | Bachl | 415/69 |

Primary Examiner—Louis J. Casaregola
Attorney, Agent, or Firm—Blanchard, Flynn, Thiel, Boutell & Tanis

[57] ABSTRACT

A fluid flow machine has at least one disc-shaped rotor provided with flow channels for a flow medium, the intake and exit openings of said channels being located axially of said rotor. The distance of the intake openings from the axis of rotation is different from that of the exit openings. Each flow channel has a radially outer and a radially inner deflector elbow having two legs extending at an angle of about 90° relative to one another, one leg of one elbow leading to an intake opening and one leg of the other elbow leading to the respective exit opening. The respective other legs of the two elbows are aligned with a substantially radial connecting section interconnecting the two deflector elbows. A higher pressure drop per stage is obtained by providing that the intake openings as well as the exit openings are located at the same axial surface of the rotor.

17 Claims, 10 Drawing Figures

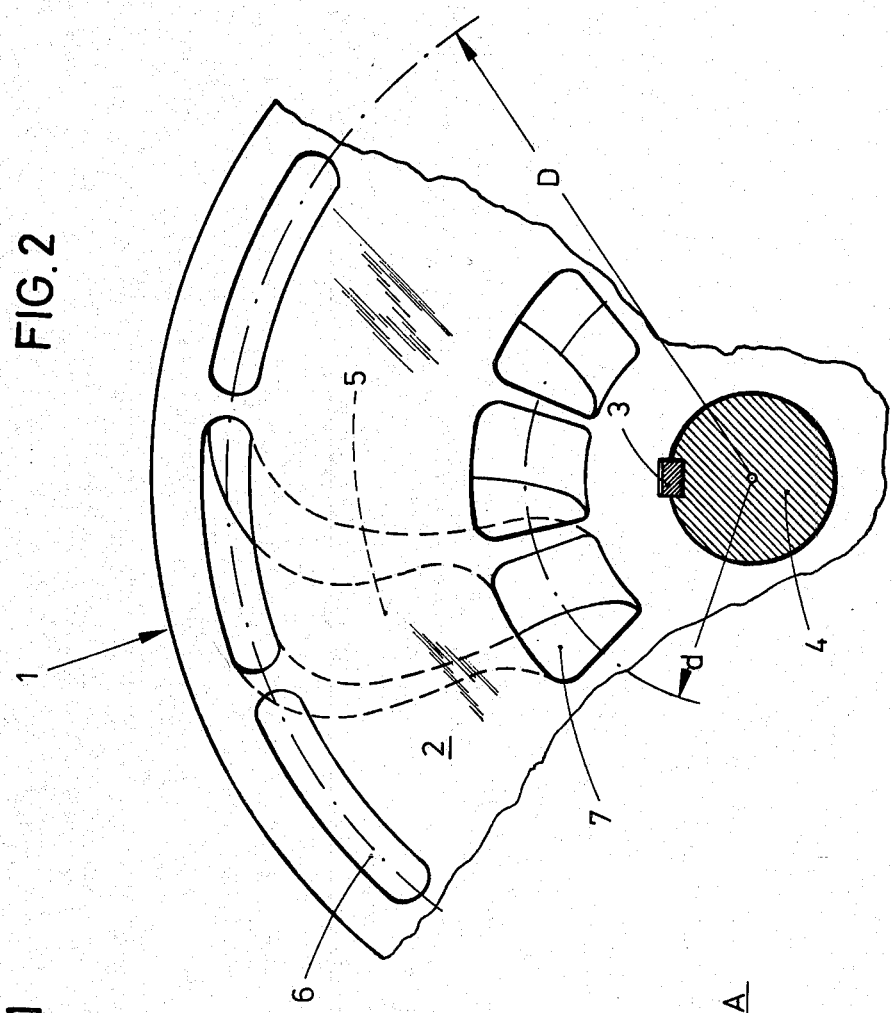
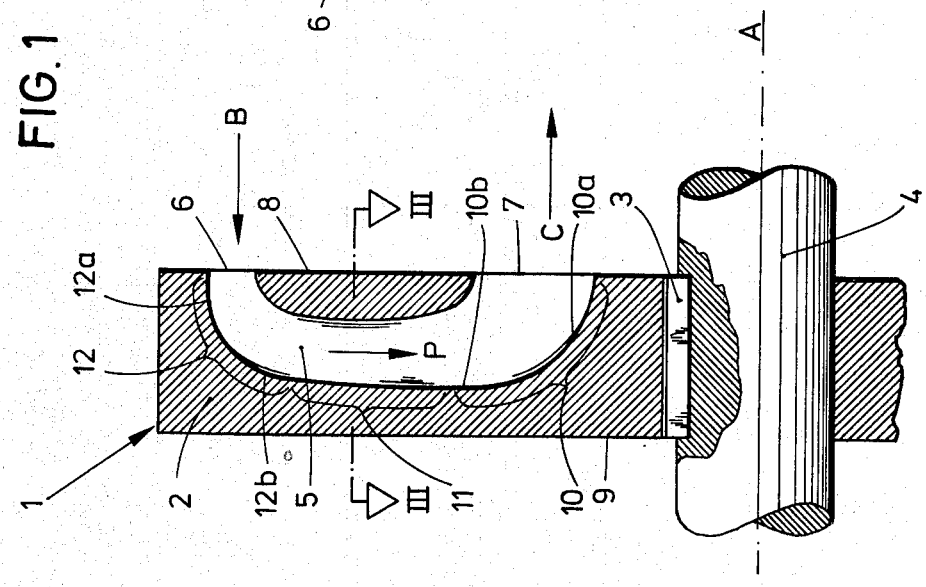

FLUID FLOW MACHINE

FIELD OF THE INVENTION

This invention relates to a fluid flow machine having at least one substantially disc-shaped rotor provided with flow channels for a flow medium.

DESCRIPTION OF THE PRIOR ART

Fluid flow machines of this kind are known in which the intake and exit openings of said channels are located axially of said rotor, all of said intake openings being located at a predetermined distance from the axis of rotation different from the respective distance of said exit openings from said axis, each said flow channel having a radially outer and a radially inner deflector elbow formed with two legs extending at an angle of about 90° relative to one another, one leg of one elbow leading to the intake opening and extending in the direction of the relative velocity of the intake flow of the flow medium prevailing thereat, and one leg of the other elbow leading to the respective exit opening and extending in the direction of the relative velocity of the exit flow, the respective other legs of said elbows being aligned with a common substantially radial connecting section interconnecting the two deflector elbows.

Known from U.S. Pat. No. 4,029,431 (DE-OS No. 24 40 475) is a fluid flow machine of the type defined in the introduction, wherein the elbows of the flow channels are directed such that the axial components of the relative velocities at the intake and exit openings extend in the same direction, with the tangential components being directed opposite to one another. The intake openings in this case are located on one axial surface, while the exit openings are formed in the other axial surface.

This known fluid flow machine is particularly suited for employ as a power generating or powered working machine when designed for low high-speed capacity, i.e. for small flow-through volumes in relation to the pressure drop per stage. That is because the strong tangential deflection of the flow within the rotor results in low relative velocities permitting a low-loss flow-through also of smaller flow volumes, and at the same time requiring relatively high pressure drops per stage in response to sufficiently high circumferential and absolute velocities at the intake and exit openings.

SUMMARY OF THE INVENTION

It is an object of the present invention to improve a fluid flow machine of the type set forth in the introduction so as to enable it to achieve a still higher pressure drop per stage.

To attain this object, the invention provides that the intake openings as well as the exit openings are located on the same axial surface of the rotor.

According to the invention, the flow channels are formed in such a manner that their intake openings are located on the same axial surface as the exit openings. This configuration permits a centrifugal as well as a centripetal flow through the rotor. At the same time it is possible to alternatively design the flow channels such that an axial deflection does or does not take place. This depends entirely on the final purpose and the desired flow-through. Due to the intake and exit openings being formed in the same axial surface, a deflection of about 180° takes place in the radial direction within the flow channels. This results in a very high pressure drop per stage.

In an advantageous embodiment, the invention provides that the rotor has at least a first group of flow channels with their intake and exit openings formed in one axially facing surface and at least a second group of flow channels with their intake and exit openings formed in the other axial surface.

In this embodiment, there are two groups of flow channels extending through the rotor, with the intake and exit openings of one group formed in one axial surface and the respective openings of the other group formed in the other axially facing surface. In this case, flow through the flow channels of one group may be in the centrifugal direction, and flow through the channels of the other group, in centripetal direction. Also possible is centrifugal or centripetal flow through the channels of both groups.

This configuration results in several advantages. If one group of flow channels serves for expansion of the flow medium, while the other group is employed for compression of the flow medium, the combination of the two groups of flow channels results in efficient cooling of the rotor, enabling it to operate at high inlet temperatures without the danger of adverse effects on the material. Also, if one group of flow channels is employed for compression and the other group, for expansion of the flow medium, there is the advantageous possibility of direct energy transmission through the separation walls of the flow channels within the rotor. In this case, the shaft has only to take up the difference between power generation and compression work.

This configuration is suitable for any drive mechanism requiring synchronous operation of compressors and expansion apparatus, such as turbo-compressors, gas turbines for vehicle drives and the like. A combination of two stages on a single shaft permits the guide channel between opposite rotor openings to be very short and of particularly simple design.

In another advantageous embodiment of the invention, there is provided one group of flow channels having their intake or exit openings, respectively, formed in the circumferential surface of the rotor, and their exit or intake openings, respectively, in one of the two axial surfaces. This configuration results in a partially radial flow through the rotor with a deflection of about 90° adjacent the intake or exit openings in one of the two axial surfaces.

This embodiment may be of advantage if one and the same rotor contains three groups of flow channels in which different changes of state are taking place, since in this case there will be large spacings for the location of sealing means between the openings in the axial surfaces and the circumferential surface.

With regard to sealing within the fluid flow machine it is advantageous to provide sealing elements axially projecting into the rotor at locations between openings through which the flow medium flows at different pressures.

Since the flow paths of labyrinth seals alternately extend in radial and axial directions, less space is required in the stator for locating the seals, and the mass of the rotor is simultaneously reduced.

Embodiments of the invention shall now be described with reference to the accompanying drawings, wherein:

BRIEF DESCRIPTION OF THE DRAWINGS

FIG. 1 shows a radial sectional view of a centripetal-flow rotor of a fluid flow machine in a first embodiment of the invention, FIG. 2 shows a front view of the rotor of FIG. 1.

DETAILED DESCRIPTION

Figure 3:
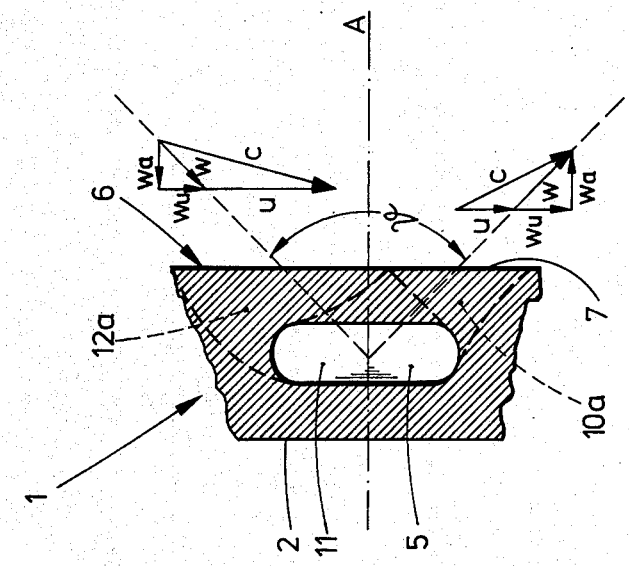
FIG. 3 shows a partial sectional view of the rotor along the line III—III in FIG. 1.

FIGS. 1 to 3 show a fluid flow machine 1 according to the invention comprising a first embodiment of a rotor 2. The rotor 2 is disc-shaped and fixedly secured to a shaft 4 as by a key 3.

Rotor 2 has nine flow channels 5 for flow-through of a fluid, only one of said channels being shown in FIG. 1. Flow channels 5 have intake openings 6 and exit openings 7. As seen in FIG. 2, intake openings 6 are formed as slots, the corners of which may be rounded. The slots are located along an annulus concentric with the axis of shaft 4 at a mean diameter D as in FIG. 2. As also shown in FIG. 2, the radial dimension of exit openings 7 is greater than that of intake openings 6, while their circumferential dimension is smaller. This results in a substantially rectangular or trapezoidal shape of the exit openings.

The exit openings are likewise located along an annulus concentric with the axis of shaft 4 at a mean diameter d as in FIG. 2.

In the shown embodiment, d is about one-third of D. This means that the exit openings are located much closer to shaft 4 than the intake openings. As seen particularly in FIG. 1, intake openings 6 are located on the same axial surface 8 of the rotor 2 as exit openings 7, the other axial surface 9 in the shown embodiment having neither intake nor exit openings.

Any intake opening 6 communicates with the associated exit opening 7 through the respective flow channel 5 within rotor 2. Channel 5 comprises a radially inner elbow 10, a connecting section 11, and a radially outer elbow 12. One leg 10a of elbow 10 extends directly from exit opening 7. Connecting section 11 is formed as a substantially radial flow connection between the other leg 10b of elbow 10 and one leg 12b of elbow 12. The other leg 12a of elbow 12 is in direct communication with intake opening 6. The two legs of each elbow extend at an angle of about 90° to one another. The flow channels may retain over their entire length the rectangular cross-sectional shape derived from that of the intake or exit openings, or they may be of round or oval cross section between transition portions communicating with the openings.

Arrow P in FIG. 1 indicates that the rotor is designed for centripetal fluid flow. The invention is not, however, restricted to rotors having flow channels for centripetal fluid flow, centrifugal flow through the rotor being also possible.

FIG. 3 of the drawings shows a partial section through the rotor of FIG. 1 according to the line III—III therein. Clearly shown at the center of the rotor is the substantially radially extending connecting section 11, which is of oval cross-sectional shape at this location.

The remainder of the flow channel is shown in phantom lines. Fluid flow enters intake opening 6 with a relative velocity w, as shown by a velocity triangle opposite the intake side. The relative velocity w is small enough to ensure that the fluid flow entering the rotor is received by the flow channel with minimum loss. The velocity triangle also shows the circumferential speed u and the absolute speed c as well as the tangential and axial components $w_u$ and $w_a$, respectively, of the relative velocity w.

At the exit side it is seen that the fluid flow leaving through opening 7 has been axially deflected by an angle $\theta$, said angle having a magnitude of about 90° in the present case.

A velocity triangle opposite the exit side also shows the relative velocity w, the circumferential speed u, and the absolute velocity c, as well as the tangential and axial components $w_u$ and $w_a$, respectively, of the relative velocity w.

It is evident that the tangential components $w_u$ at the intake and exit sides extend in the same direction, while the axial components $w_a$ of the relative velocity at the intake and exit side extend opposite to one another.

As evident from the above, the fluid flow through the rotor shown in FIGS. 1 to 3 is deflected not only axially about the angle $\theta$, but also radially about an angle of about 180°. This is clearly shown in FIG. 1, wherein arrow B shows the intake flow, and arrow C indicates the exit flow after radial deflection about an angle of 180°. That is, arrow C points in a direction opposite to that of arrow B. This configuration results in a very high pressure drop within the rotor.

Figure 4:
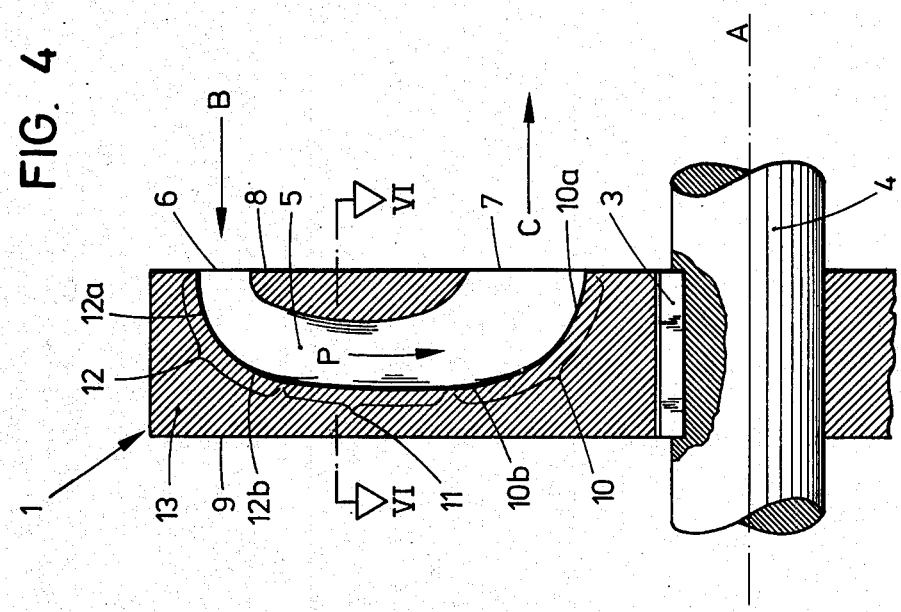
FIG. 4 shows a radial sectional view of a rotor of a fluid flow machine in a second embodiment of the invention.
Figure 6:
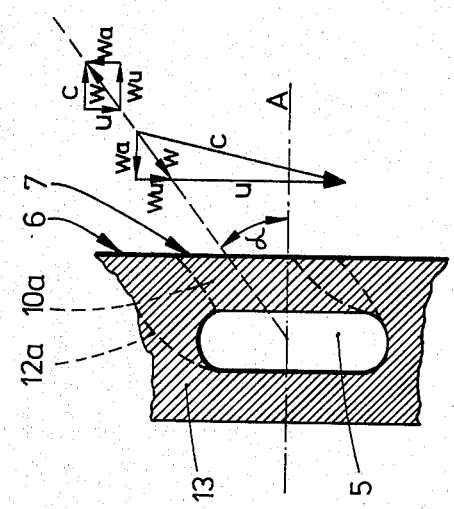
FIG. 6 shows a partial sectional view of the rotor along the line VI—VI in FIG. 4.
Figure 5:
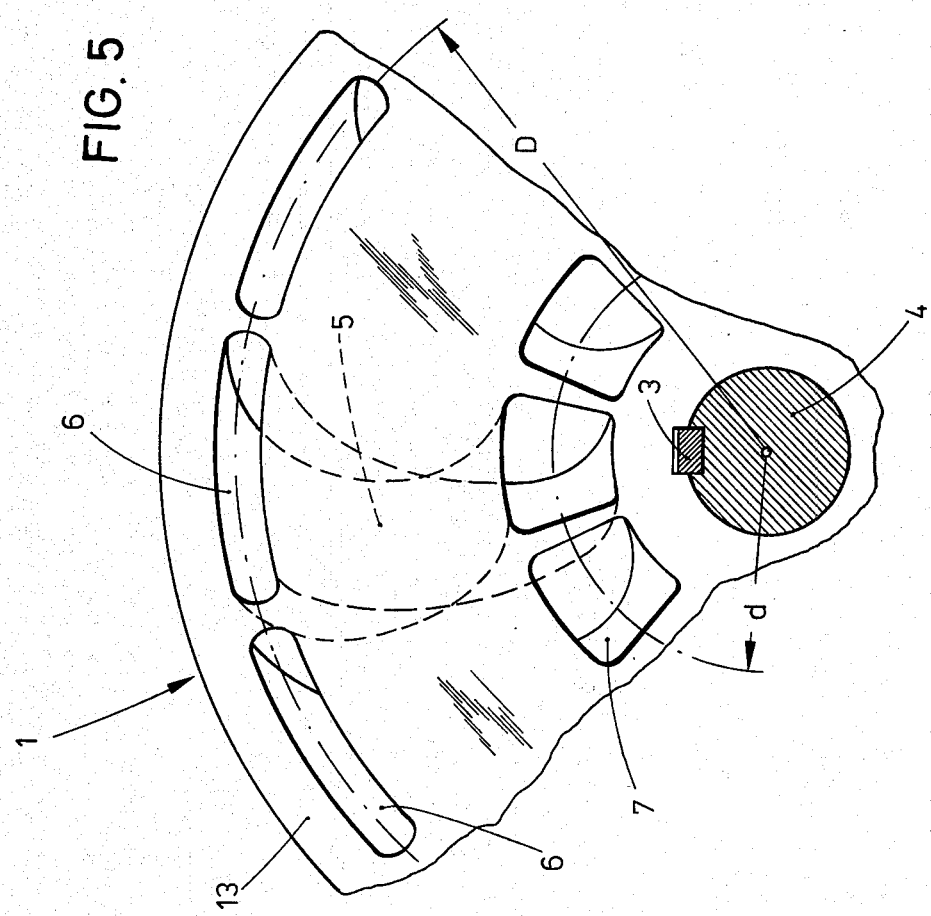
FIG. 5 shows a front view of the rotor of FIG. 4.

FIGS. 4, 5 and 6 show a second embodiment of a rotor 13 for a fluid flow machine 1 according to the invention. Inasmuch as the second embodiment differs from the first one only in certain details, only such differences shall be discussed, reference being had for the remainder to the description of the first embodiment. Identical parts are designated by the same reference numerals.

The second embodiment is also designed for centripetal flow through the flow channels. As in the embodiment shown in FIGS. 1 to 3, the intake openings 6 are located at a greater radial distance D from the axis of rotation A than the exit openings 7. Also in this case, the intake and exit openings of the flow channels are formed in a common axial surface 8 of the rotor.

As different from the first embodiment, the intake and exit openings of the flow channels are directed such that the entering fluid flow and the exiting fluid flow extend in the same direction. As shown in FIG. 6, the legs 10a, 12a connecting the radially inner elbow 10 and the radially outer elbow 12, respectively, with the associated openings extend in the same direction as indicated by the angle $\alpha$ in FIG. 6. The entering flow as well as the exiting flow are each represented by a velocity triangle. The velocity triangle adjacent the rotor refers to the entering flow, showing its relative velocity w, its circumferential velocity c, and its absolute velocity c, with the relative velocity being resolved into its axial and tangential or circumferential components $w_a$ and $w_u$, respectively.

The same designations have been used for the velocity triangle referring to the exit flow. It is seen that the relative velocity at the exit side extends in the same direction as the relative velocity at the intake side, as designated by the angle α, although in the opposite sense. It is therefore noted that the tangential as well as the axial components $w_u$ and $w_a$, respectively, of the relative velocities at the intake side and exit side are directed oppositely to one another. This configuration of the rotor 13 also ensures a high pressure drop. Intermediate configurations between the embodiments of FIGS. 1 to 3 and 4 to 6, respectively, are of course also possible.

Figure 7:
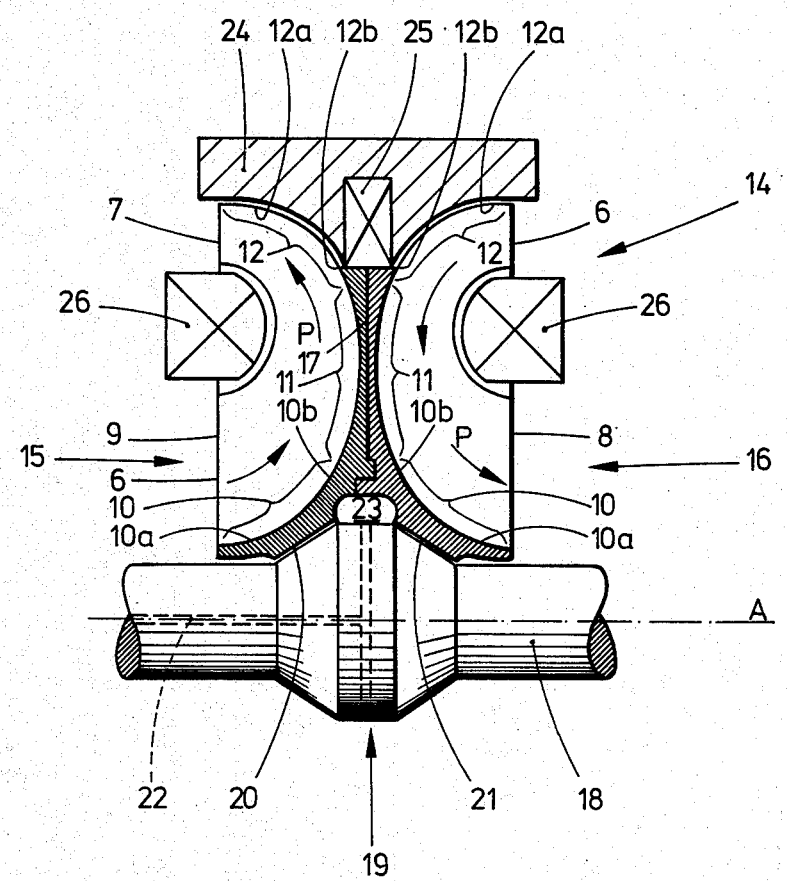
FIG. 7 shows a partial radial sectional view of a rotor containing two groups of flow channels.

FIG. 7 shows a rotor 14 containing two groups 15 and 16 of flow channels. The basic design of this rotor is similar to that of rotors 2 and 13 shown in FIGS. 1 to 6. Corresponding parts have therefore been again denoted by the same reference numerals. The difference to the preceding embodiments consists in the two groups 15 and 16 of flow channels being located back-to-back in a common rotor body.

The shown rotor is intended for use in a turbo compressor, in which exhaust gases are employed in a known manner for achieving the compression of the working medium required by an internal combustion engine.

To this purpose, the respective flow medium flows radially outwardly in the flow channels of the one group 15, and radially inwardly in the channels of the other group 16. This is because the expanding exhaust gases are directed through the channels of the latter group 16, while the channels of the former group 15 are used for the compression of the working medium.

As seen in FIG. 7, the intake openings 6 of group 15 are located radially closer to the axis of rotation A than the exit openings 7. In the case of this group of flow channels, the legs 10a of elbows 10 are directed towards the intake openings 6, while the legs 12a of elbows 12 lead to the exit openings 7.

The centrifugal or centripetal flow, respectively, in the channels of groups 15 and 16 is indicated by arrows P.

In the embodiment shown, the rotor has a radial separation joint 17 and is thus composed of two parts mounted back-to-back to form a combined structure. At this instance, one part of the rotor contains the flow channels of group 15 with their intake and exit openings 6 and 7, respectively, located in one axial surface 9, while the other part of the rotor contains the channels of group 16 with their intake and exit openings 6, 7 at the other axial surface 8.

The rotor is mounted on a fixed shaft 18 having a major diameter bearing portion in the shape of a double conus 19. The rotor has complementary conical bearing surfaces 20, 21 by which it is rotatably supported on the bearing portion 19 of the shaft. The bearing is designed as a pneumatic pressure bearing. To this effect, pressurized gas is supplied to an annular distribution chamber 23 by way of a supply duct 22 shown in phantom lines in FIG. 7.

The rotor 14 has no radial covering at the outer portions of the flow channels. In place thereof, there is provided a housing 24 surrounding the radially outer boundary of the rotor 14. Provided between the flow channels of groups 15 and 16 is a seal 25 projecting into rotor 14 in radial direction. Further seals 26 are provided between the intake and exit openings 6 and 7, respectively, of the channels of the two groups 15 and 16. The absence of a radial covering results in an advantageously low mass inertia in the rotor 14 of the turbo compresso shown.

Figure 8:
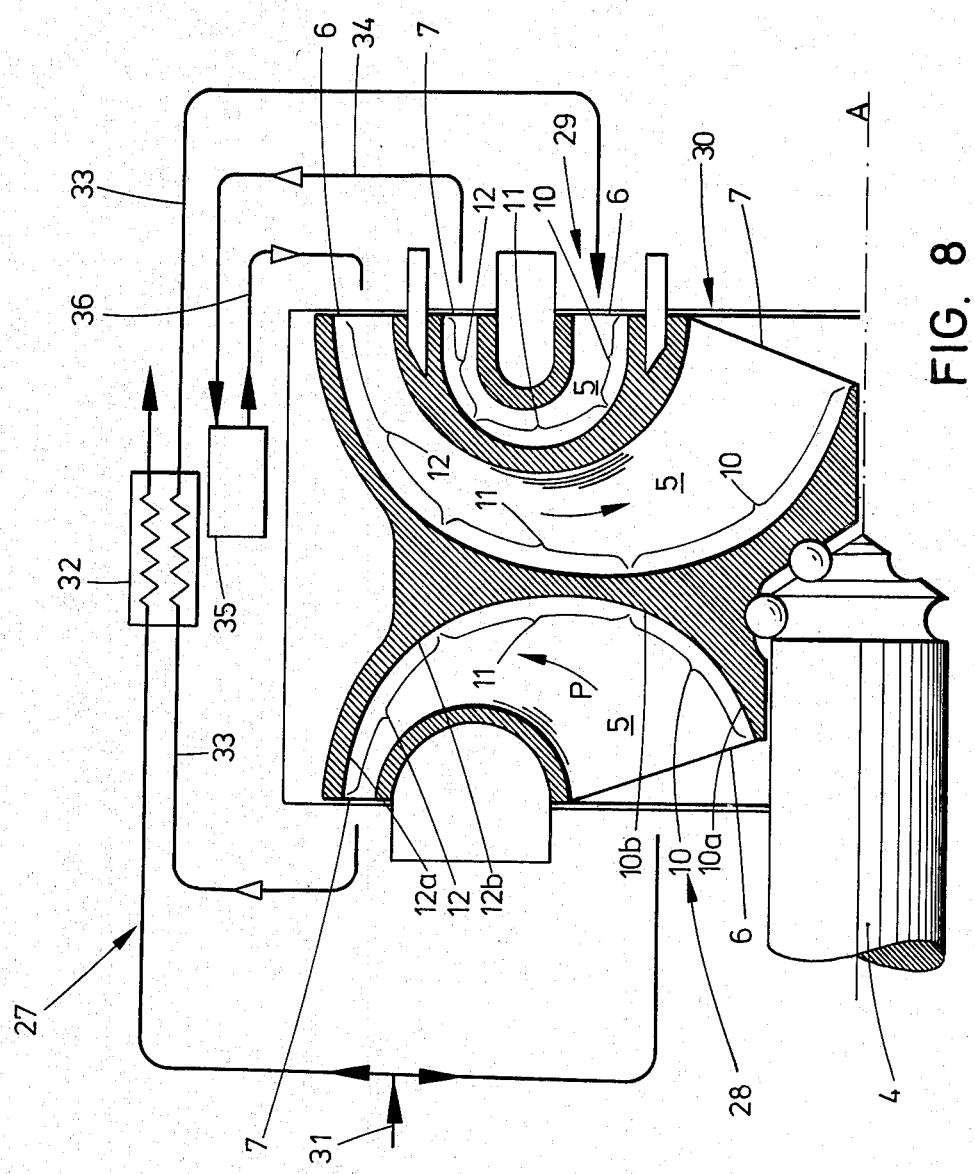
FIG. 8 shows a partial radial sectional view of a rotor having three groups of flow channels.

FIG. 8 shows a rotor 27 of a gas turbine. The same parts have again been designated by the same reference numerals. The rotor 27 is rotatably mounted on shaft 4 by means of ball bearings and contains three groups of flow channels, namely, a first and a second compression group 28 and 29, respectively, and an expansion group 30.

All of the flow channels of group 28 have their intake and exit openings formed in the lefthand end surface of the rotor, while the intake and exit openings of the flow channels in the other two groups 29 and 30 are located at the other end surface of the rotor.

The flow conditions within rotor 27 are as follows: Through a duct 31, air is supplied to a heat exchanger 32 as well as to flow channel group 28 for feeding a combustion chamber. Within the flow channels 5 of group 28, the radially outwardly directed flow results in compression of the air. The compressed air leaving the exit openings 7 flows along a duct 33 to the heat exchanger 32, and from there to the intake openings 6 of the flow channels of group 29. Due to the exit openings 7 of the flow channels in this group being located further radially outward than the intake openings thereof, the flow through these channels is again centrifugal, resulting in further compression of the air. From the exit openings of these channels, the air flows through a duct 34 to the combustion chamber 35. The spent flow medium then flows through a duct 36 to the radially outer intake openings 6 of the group 30 flow channels for expanding therein before leaving the flow channels through the exit openings 7 located radially closer to the axis of rotation A.

It is to be noted that the flow channels of group 29 are formed within the rotor in a space left unoccupied by the curvature of the flow channels of group 30.

Figure 9:
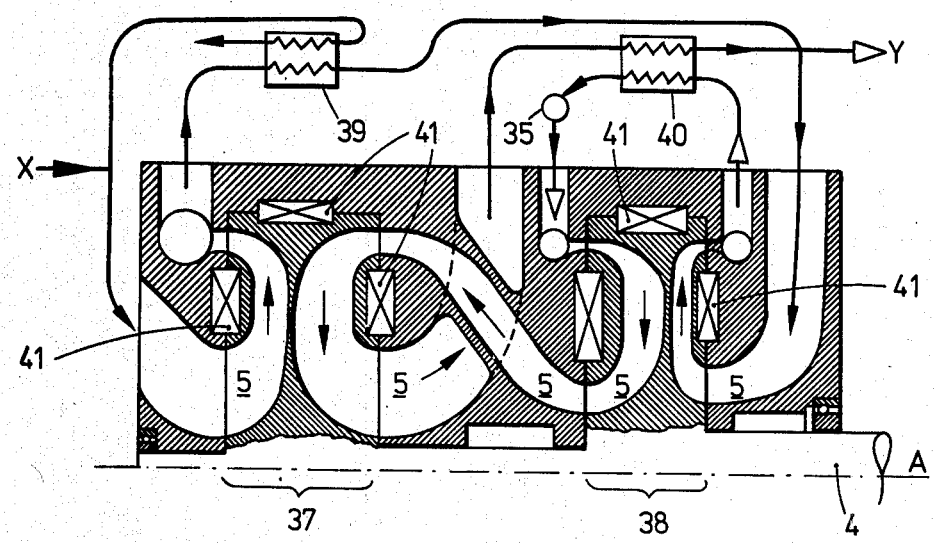
FIG. 9 shows a partial radial section through a two-stage single-shaft gas turbine with integral compressor.

FIG. 9 shows a two-stage fluid flow machine having two rotors 37 and 38 affixed to a common shaft 4. Flow through this machine is indicated by arrows. It is evident that the two rotors 37 and 38 are substantially similar to the rotor 14 of FIG. 7, with the exception that radial covering is provided for both rotors.

The flow medium flowing through this machine passes twice through intermediate coolers 39, 40 and once through a combustion chamber 35.

Clearly shown in this figure are the sealing elements 41 projecting into the rotors in radial and axial directions.

FIG. 10 again shows a diagrammatic representation of a two-stage gas turbine having two rotors 42 and 43, the latter of which is fixedly secured to shaft 4, while the former is freely rotatable on shaft 4.

Figure 10:
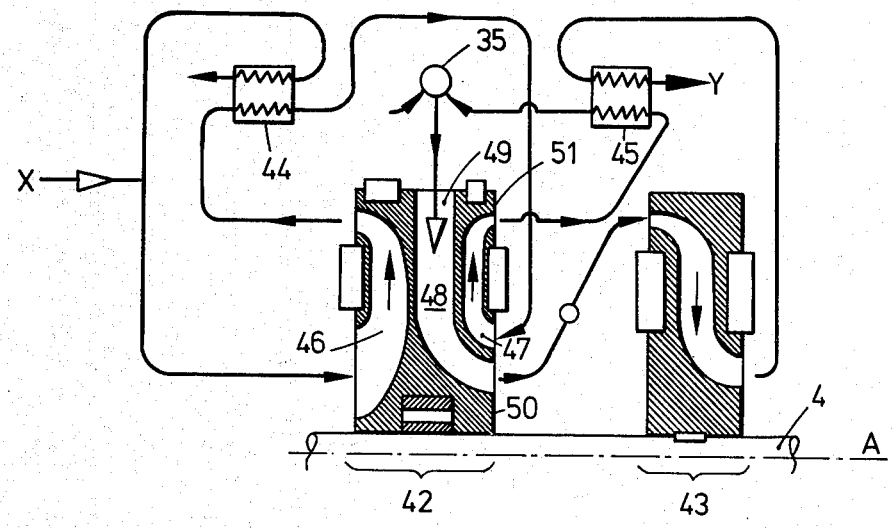
FIG. 10 shows a two-stage gas turbine having two rotors.

The flow through the fluid flow machine of FIG. 10 is clearly indicated by arrows. The flow medium is initially supplied at X, and leaves the assembly at Y. The shown apparatus includes an intermediate cooler 44, a combustion chamber 35 and an exhaust gas heat exchanger 45. Rotor 42 contains two compression stages, namely a first and a second group of flow channels 46 and 47, respectively. In addition, rotor 42 contains an expansion stage 48 with radial flow entry. This means that the intake openings 49 of the flow channels of expansion group 48 are located at the circumferential surface of rotor 42. After a deflection about approximately 90°, the fluid flow leaves the flow channels through exit openings 50 in end surface 51. The flow channel group 48 thus constitutes an expansion stage.

The other rotor 43 has its flow channels arranged for centripetal flow-through and thus constitutes a further expansion stage.

Although particular preferred embodiments of the invention have been disclosed in detail for illustrative purposes, it will be recognized that variations or modifications of the disclosed apparatus, including the rearrangement of parts, lie within the scope of the present invention.

The embodiment of the invention in which an exclusive property or privilege is claimed are defined as follows:

1. In a fluid flow machine having at least one substantially disc-shaped rotor provided with a quantity of flow channels for a flow medium, the intake and exit openings of said channels opening through axially facing parts of said rotor, all of said intake openings being located at a predetermined distance from the axis of rotation different from the respective distance of said exit openings from said axis, each said flow channel having a radially outer and a radially inner deflector elbow formed with two legs extending at an angle of about 90° relative to one another, one leg of one elbow leading to the intake opening and extending in the direction of the relative velocity of the intake flow of the flow medium prevailing thereat, and one leg of the other elbow leading to the respective exit opening and extending in the direction of the relative velocity of the exit flow, the respective other legs of said elbows being aligned with a common substantially radial connecting section interconnecting the two deflector elbows, the improvement comprised in that the intake openings as well as the exit openings are located at the same axial surface of said rotor, said one legs having wall surfaces facing circumferentially of said rotor, which wall surfaces are curved from said elbows to the respective intake and exit openings, said curvature appearing in cutting planes extending perpendicular to the radial extent of the corresponding flow channel, said one legs extending toward their respective intake and exit openings in directions which, when projected on a plane containing the axis of the rotor and perpendicular to the radial extent of the corresponding flow channel, subtend substantially equal angles with said rotor axis, said angles each being approximately halfway between zero and a right angle, said rotor being a solid disc-like body wherein the wall thickness of said flow channels varies in dependence on the location of portions of said flow channel in said body, said same axial surface of said rotor being a common radially planar first side of said rotor, said disc-shaped rotor having a radially planar second side coextensive with and parallel to said first side and extending from a central opening to the peripheral wall of said disc, so as to permit axial stacking of additional radially planar sided bodies carrying additional flow channels flush on both sides of said rotor for flow communication between flow channels in said rotor and at least one additional body.

2. A fluid flow machine according to claim 1, in which said rotor includes at least a first group of flow channels having their intake and exit openings located on one axial surface and at least a second group of flow channels having their intake and exit openings located at the other axial surface of said rotor.

3. A fluid flow machine according to claim 1, including a group of further flow channels having their intake, or exit openings, respectively located at the radial peripheral surface of said rotor, and their exit, or intake openings, respectively, at one of the two axial surfaces.

4. A fluid flow machine according to claim 1, including sealing elements axially projecting into said rotor at locations between openings subjected to flow-through at different pressures.

5. A fluid flow machine according to claim 1, in which the flow channels are formed without radial closure at least in the outer portion of the rotor.

6. A fluid flow machine according to claim 2, in which the intake openings of said first group of flow channels are located radially outboard of the exit openings thereof whereas the exit openings of said second group of flow channels are radially outboard of the intake openings thereof.

7. A fluid flow machine according to claim 6, in which the rotor has a radial separation and is thereby composed of two parts respectively carrying said first and second groups of flow channels.

8. A fluid flow machine according to claim 7, in which said rotor is mounted on a shaft having an enlarged diameter bearing portion in the shape of a double conus, the rotor having complementary opposed conical bearing surfaces by which it is mounted on said shaft.

9. A fluid flow machine according to claim 6, including a third group of flow channels in said rotor with intake and exit openings opening through the same axial surface as one of said first and second groups in the annular portion of said axial surface radially between the annular portions of said surface occupied by the intake and exit openings of said one of said groups, such that said one group of flow channels is sandwiched axially of said rotor between the third and other groups.

10. A fluid flow machine according to claim 6, including a third group of flow channels sandwiched axially between said first and second groups, the sandwiched group comprising centripetal hot gas exhaust expansion channels and the sandwiching groups comprise centrifugal inlet air compression channels.

11. A fluid flow machine according to claim 1 in which said one legs are angled in opposite circumferential directions toward said respective intake and exit openings in directions which, when projected on said plane containing the axis of the rotor and perpendicular to the radial extent of the corresponding flow channel, subtend an included angle $\theta$ of approximately 90° therebetween, the relative velocities of the flow in said flow channel having tangential components directed in the same tangential direction at both the intake and exit openings.

12. A fluid flow machine according to claim 1 wherein said angles, subtended by the directions of said intake and exit openings projected on said plane, are substantially equal and angle in the same tangential direction from said rotor axis, wherein the relative velocities at said intake and exit openings have tangential components directed oppositely.

13. In a fluid flow machine, a disc-shaped rotor provided with flow channels, the central portions of the flow channels extending substantially radially in said rotor, the flow channels having discrete openings arranged on different annular lines on the front side of the rotor, each flow channel starting out from each one of its openings and leading through a corresponding elbow into said radially extending central portion of said flow channel, the radii of curvature of which flow channels, at least in the area nearest to the openings, lying in respective planes, which planes each correspond to the plane of the respective relative velocity of the flow medium at such opening, the relative velocities having tangential components directed in the same tangential direction at both the inlet openings and the outlet openings, the relative velocities having axial components directed oppositely at both the inlet openings and the outlet openings.

14. A fluid flow machine according to claim 13 wherein said inlet portion and outlet portion of each flow channel extend toward their respective inlet and outlet openings in directions which, when projected on a plane containing the axis of the rotor, subtend an angle $\theta$ of approximately 90° therebetween, which angle $\theta$ is approximately bisected by said rotor axis.

15. A fluid flow machine according to claim 14 wherein said inlet openings and outlet openings open through a common radially planar face defining said front side of said rotor, said disc-shaped rotor having a radially planar rear side coextensive with said front side and parallel thereto and extending from a central opening to the peripheral wall of the disc, said rotor being a solid disc-like body wherein the wall thickness of said flow channels varies in dependence on the location of portions of said flow channels in said body.

16. A fluid flow machine according to claim 15 wherein said inlets lie in a circle spaced radially outward on the side of said disc from a concentric circle along which said outlets are spaced, said flow channels being centripedal flow channels.

17. A fluid flow machine according to claim 16 wherein, as viewed axially, said inlet openings are circumferentially elongate radially slim oblong openings curved along their common circumferential line on the rotor, said outlet openings being of approximately similar circumferential and radial extent, the circumferential and radial extents of said outlet openings being respectively less than and greater than the corresponding extents of said inlet openings, said flow channels each following a curve from inlet to outlet thereof, the projection of which curve on a radially extending plane of the rotor is S-shaped, the walls of said flow channel being angled circumferentially near both of said inlet and outlet openings.

* * * * *

UNITED STATES PATENT OFFICE
CERTIFICATE OF CORRECTION

Patent No. 4 278 397            Dated July 14, 1981

Inventor(s) Herbert Bachl

It is certified that error appears in the above-identified patent and that said Letters Patent are hereby corrected as shown below:

Column 10, line 7; change "inlets" to
                         ---inlet openings---.

line 9; change "outlets" to
                         ---outlet openings---.

Signed and Sealed this

Twenty-fourth Day of November 1981

[SEAL]

*Attest:*

GERALD J. MOSSINGHOFF

*Attesting Officer*      *Commissioner of Patents and Trademarks*